No. 669,282. Patented Mar. 5, 1901.
H. E. LANPHER.
CLAMP.
(Application filed Mar. 7, 1900.)
(No Model.)
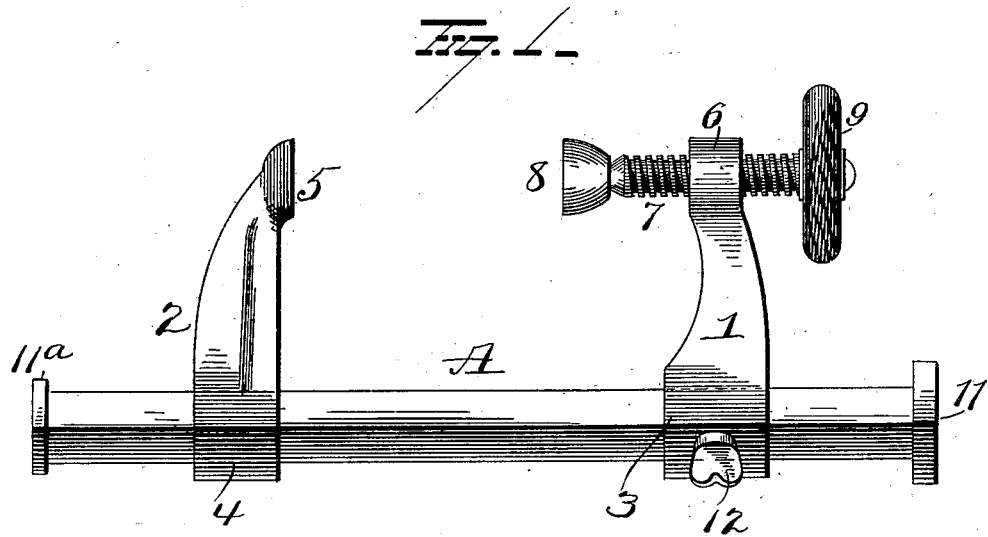
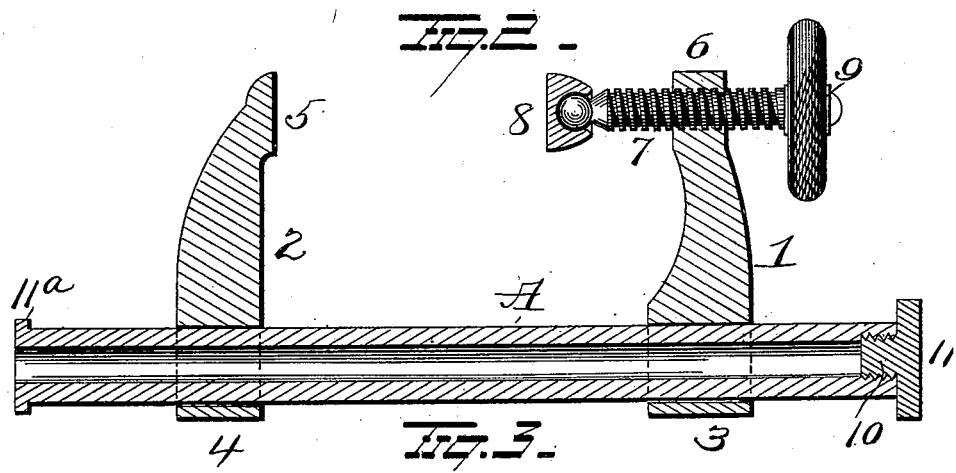
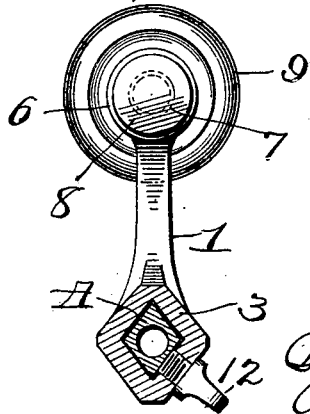
WITNESSES
E. J. Nottingham
G. F. Downing
INVENTOR
H. E. Lanpher
By H. A. Seymour
Attorney
THE NORRIS PETERS CO., PHOTO-LITHO., WASHINGTON, D. C.

UNITED STATES PATENT OFFICE.

HARRY E. LANPHER, OF ABBOT VILLAGE, MAINE.

CLAMP.

SPECIFICATION forming part of Letters Patent No. 669,282, dated March 5, 1901.

Application filed March 7, 1900. Serial No. 7,691. (No model.)

*To all whom it may concern:*

Be it known that I, HARRY E. LANPHER, a resident of Abbot Village, in the county of Piscataquis and State of Maine, have invented certain new and useful Improvements in Clamps; and I do hereby declare the following to be a full, clear, and exact description of the invention, such as will enable others skilled in the art to which it appertains to make and use the same.

My invention relates to an improvement in clamps, the object of the invention being to provide a clamp which can be quickly adjusted and which will be strong and absolutely secure when in use.

With this object in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a view in section of the same; and Fig. 3 is an end elevation, partly in section.

A represents a straight bar, preferably of metal, diamond-shaped in cross-section and made preferably hollow for lightness and strength. Two movable jaws 1 and 2 are mounted on the bar A, and each is made with rectangular bearings 3 4, respectively, having elongated openings therein of similar shape to the shape of the bar, but slightly larger to permit the jaws to be freely moved on the bar. The jaw 2 is provided on its free end with a flat clamping-face 5, and the jaw 1 is provided on its free end with an internally-screw-threaded enlargement 6, whose opening is in alinement with the clamping-face 5, and a threaded rod 7 is mounted in said enlargement and is provided on one end with a swiveled head 8 and on its other end with a hand-wheel 9 to facilitate turning the rod to clamp an object between the head 8 and clamping-face 5, as will be readily understood. One end of the bar A is internally threaded for the reception of a screw 10, having an enlarged angular head 11 of larger diameter than the diameter of the bar A, and the other end of said bar is made with an integral enlargement 11ª to prevent the accidental removal of the jaws. Said screw 10 can be readily removed when desired to use a longer or shorter bar, and for this purpose my improved jaws will when sold to the trade be accompanied by a set of bars of different lengths.

The jaw 1 is provided with a set-screw 12, so as to lock the jaw in any position desired; but in ordinary use, where quick action is desired, the set-screw will not be operated at all.

It will be seen that the jaws 1 and 2 can be readily moved to any position on the bar, and when an object is in proper position between them the rod 7 is operated and the free ends of the jaws will be forced slightly apart, while the bearing ends thereon will securely clamp the bar and prevent any possibility of slipping, and owing to the diamond shape of the bar and bearings both jaws will rigidly engage all four sides or faces of the bar and clamp the bar more securely than has been accomplished with any device of similar character heretofore known.

Instead of making the rod 7 screw-threaded and operating it by a hand-wheel, I might provide a cam-lever of any well-known construction for operating the rod, and various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A clamp comprising a bar having a series of four straight, flat inclined faces extending from end to end thereof and the edges of said flat faces being coincident at the top and bottom edges of the bar, of a jaw having a hole passing transversely therethrough near one end, the wall of said hole comprising a series of four inclined flat faces corresponding to the flat faces of the bar and identical to the cross-section of the bar, so that all the flat faces composing the wall of the hole in the jaw will bear simultaneously throughout their extent against all the flat faces of the bar, and another jaw carried by the bar to coöperate with the first-mentioned jaw.

2. In a clamp the combination with a bar having a series of four faces straight, flat, and inclined throughout their full extent, the cross-section of said bar being such that the edges of said flat faces will coincide at the top, bottom and side edges of the bar, of two clamping-jaws, both mounted to slide on the bar, the holes in the jaws through which the bar passes having a cross-section identical in form to the cross-section of the bar and an adjusting device carried by one of said jaws.

3. In a clamp, the combination of a hollow bar having four inclined faces straight and flat throughout their full extent, the edges of said faces meeting at the top, bottom and side edges of the bar, an integral flange at one end of said bar, a removable head attached to the other end of the bar, and two jaws movably mounted on the bar, each having a hole for the passage of the bar of a cross-section identical with the contour of the bar.

In testimony whereof I have signed this specification in the presence of two subscribing witnesses.

HARRY E. LANPHER.

Witnesses:
HENRY HUDSON,
M. HUDSON.